(12) United States Patent
Miller et al.

(10) Patent No.: US 9,946,700 B2
(45) Date of Patent: Apr. 17, 2018

(54) SYSTEMS AND METHODS FOR PROVIDING FOR DISPLAY A MAP THAT GRAPHICALLY REPRESENTS THE ASSOCIATION AMONG DOCUMENTS

(71) Applicant: LexisNexis, a division of Reed Elsevier Inc., Miamisburg, OH (US)

(72) Inventors: Richard D. Miller, Yellow Springs, OH (US); Thomas J. Goedde, Piqua, OH (US); Jacob Aaron Myers, Dayton, OH (US); Mark E. Neumeier, Xenia, OH (US)

(73) Assignee: LEXISNEXIS, A DIVISION OF REED ELSEVIER INC., Miamisburg, OH (US)

( * ) Notice: Subject to any disclaimer, the term of this patent is extended or adjusted under 35 U.S.C. 154(b) by 913 days.

(21) Appl. No.: 13/653,785

(22) Filed: Oct. 17, 2012

(65) Prior Publication Data
US 2013/0103720 A1 Apr. 25, 2013

Related U.S. Application Data

(60) Provisional application No. 61/550,567, filed on Oct. 24, 2011.

(51) Int. Cl.
*G06F 17/30* (2006.01)
*G06F 17/24* (2006.01)

(52) U.S. Cl.
CPC ...... *G06F 17/246* (2013.01); *G06F 17/30716* (2013.01); *G06F 17/30728* (2013.01)

(58) Field of Classification Search
CPC .................................................. G06F 17/2785

USPC .................................................. 707/800, 822
See application file for complete search history.

(56) References Cited

U.S. PATENT DOCUMENTS

| | | | |
|---|---|---|---|
| 5,832,494 A | 11/1998 | Egger et al. | |
| 6,018,344 A * | 1/2000 | Harada et al. | 715/818 |
| 6,341,310 B1 * | 1/2002 | Leshem et al. | 709/223 |
| 6,714,927 B1 * | 3/2004 | Ogawa | 707/715 |
| 6,833,850 B1 * | 12/2004 | Arquie et al. | 715/734 |
| 7,031,957 B2 * | 4/2006 | Harris | 707/608 |
| 7,143,392 B2 * | 11/2006 | Ii et al. | 717/125 |
| 7,188,104 B2 * | 3/2007 | Ogawa | |
| 7,529,756 B1 | 5/2009 | Haschart et al. | |
| 7,568,126 B2 * | 7/2009 | Brethereau et al. | 714/26 |

(Continued)

*Primary Examiner* — Baoquoc N To
(74) *Attorney, Agent, or Firm* — Dinsmore & Shohl LLP

(57) ABSTRACT

Systems and methods for providing for display a map that graphically represents the association among documents are disclosed. A method for providing for display a map that graphically represents the association between a first document and a second document that analyzes the first document includes receiving, at a computer, a request to generate the map. The method further includes retrieving, from a database, analysis information related to the way in which the second document analyzed the first document, in response to the received request. The method further includes providing for display the map. The map includes a first node, a second node, and a connector. The first node corresponds to the first document. The second node corresponds to the second document. The connector graphically links the first node and the second node. The second node includes a graphical representation of the analysis information.

19 Claims, 8 Drawing Sheets

(56) References Cited

U.S. PATENT DOCUMENTS

| | | | |
|---|---|---|---|
| 7,664,821 B1* | 2/2010 | Ancin et al. | 709/206 |
| 7,672,950 B2 | 3/2010 | Eckardt, III et al. | |
| 7,778,954 B2 | 8/2010 | Rhoads et al. | |
| 8,126,818 B2 | 2/2012 | Rhoads et al. | |
| 8,145,675 B2 | 3/2012 | Rhoads et al. | |
| 8,237,714 B1* | 8/2012 | Burke | 345/440 |
| 8,607,163 B2* | 12/2013 | Plummer | 715/825 |
| 8,862,670 B1* | 10/2014 | Ancin et al. | 709/206 |
| 2002/0023110 A1* | 2/2002 | Fortin et al. | 707/513 |
| 2002/0056199 A1* | 5/2002 | Laube | 30/216 |
| 2002/0091679 A1 | 7/2002 | Wright | |
| 2003/0182177 A1* | 9/2003 | Gallagher et al. | 705/10 |
| 2004/0111437 A1* | 6/2004 | Ogawa | 707/104.1 |
| 2004/0189718 A1* | 9/2004 | Stein et al. | 345/853 |
| 2005/0038533 A1* | 2/2005 | Farrell et al. | 700/73 |
| 2008/0263004 A1* | 10/2008 | Qiu et al. | 707/3 |
| 2009/0138389 A1* | 5/2009 | Barthel | 705/31 |
| 2010/0005401 A1* | 1/2010 | Stein et al. | 715/753 |
| 2010/0011302 A1* | 1/2010 | Stein et al. | 715/753 |
| 2010/0185962 A1* | 7/2010 | Zhang et al. | 715/764 |
| 2012/0166425 A1* | 6/2012 | Sharma et al. | 707/722 |
| 2012/0260182 A1* | 10/2012 | Hansen et al. | 715/736 |

\* cited by examiner

SYSTEMS AND METHODS FOR PROVIDING FOR DISPLAY A MAP THAT GRAPHICALLY REPRESENTS THE ASSOCIATION AMONG DOCUMENTS

CLAIM OF PRIORITY

This application claims the benefit of U.S. Provisional Application No. 61/550,567, entitled "Systems and Methods for Creating Appellate History Maps and Citing Decisions Grids," filed Oct. 24, 2011, the entirety of which is hereby incorporated by reference.

BACKGROUND

Field

The present specification generally relates to providing for display a map and, more particularly, to systems and methods for providing for display a map that graphically represents the association among documents.

Technical Background

Documents, such as legal documents may be related in a number of ways. For example, in the context of a court decision (e.g., a decision issued by a federal, state, or administrative court), other court decisions in the prior or subsequent appellate history of that court decision may be related with the court decision. Court decisions from the subsequent appellate history of a particular court decision may analyze, characterize, treat, or otherwise impact the particular court decision. For example, a Federal District Court decision may be reversed by a Federal Court of Appeals.

If a user is viewing a court decision on a graphical screen of a computing device, the user may be provided an option to view information related to the appellate history of the court decision. Upon selecting to view information related to the appellate history, a list of the court decisions included in the appellate history may be presented to the user in a textual list view. For example, the appellate history may be grouped in a prior appellate history section and a subsequent appellate history section.

An analysis type may be displayed along with each court decision in the appellate history of a particular court decision, which indicates the manner in which the court decisions in the appellate history analyzed the particular court decision. For example, the analysis type may be "Reversed," "Remanded," "Modified," "Appeal Denied," "Later Proceeding," "On Rehearing," "Rehearing Denied," "Writ of Certiorari Granted," "Writ of Certiorari Denied," "Amended," etc.

In some instances, the appellate history related to a particular court decision may be complicated and different cases in the appellate history may analyze, characterize, treat, or otherwise impact the court decision in a number of different ways.

A user may wish to quickly and easily understand the relationship of the court decisions in the appellate history. A user may also wish to quickly and easily understand the way in which a court decision of interest has been analyzed by particular cases in the appellate history of the court decision of interest. However, it may be burdensome and/or impractical for a user to scroll through and scan through an entire list of appellate history court decisions in order to understand the way in which the appellate history court decisions are interrelated and analyze a particular court decision of interest.

Accordingly, a need exists for systems and methods for providing alternative graphical representations of the association among documents.

SUMMARY

In one embodiment, a method for providing for display a map that graphically represents the association between a first document and a second document that analyzes the first document includes receiving, at a computer, a request to generate the map. The method further includes retrieving, from a database, analysis information related to the way in which the second document analyzed the first document, in response to the received request. The method further includes providing for display the map. The map includes a first node, a second node, and a connector. The first node corresponds to the first document. The second node corresponds to the second document. The connector graphically links the first node and the second node. The second node includes a graphical representation of the analysis information.

In another embodiment, a method for highlighting a path between a first document and a second document that analyzes the first document includes providing for display, by a computer, a map that graphically represents the association between the first document and the second document. The map includes a first node corresponding to the first document, a second node corresponding to the second document, and a first connector graphically linking the first node and the second node. The method further includes graphically processing the displayed map to highlight the path between the first node and the second node in response to a user manipulating the second node on the map.

In yet another embodiment, a system for providing for display a map that graphically represents the association between a first document and a second document that analyzes the first document includes a computing device. The computing device includes a non-transitory memory component that stores a set of executable instructions that causes the computing device to receive a request to generate the map. The executable instructions further cause the computing device to retrieve, from a database, analysis information related to the way in which the second document analyzed the first document, in response to the received request. The executable instructions further cause the computing device to provide for display the map. The map includes a first node, a second node, and a connector. The first node corresponds to the first document. The second node corresponds to the second document. The connector graphically links the first node and the second node. The second node includes a graphical representation of the analysis information.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 3:
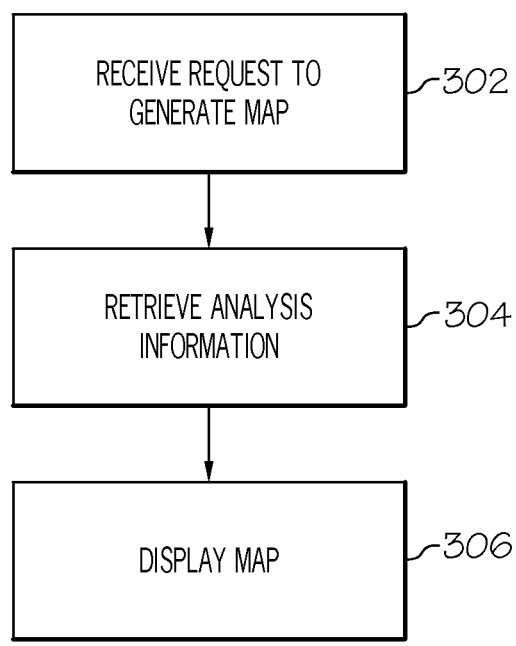
FIG. 3 depicts a flowchart graphically illustrating a method of providing for display a map that graphically represents the association among documents, according to one or more embodiments shown and described herein.
Figure 4:
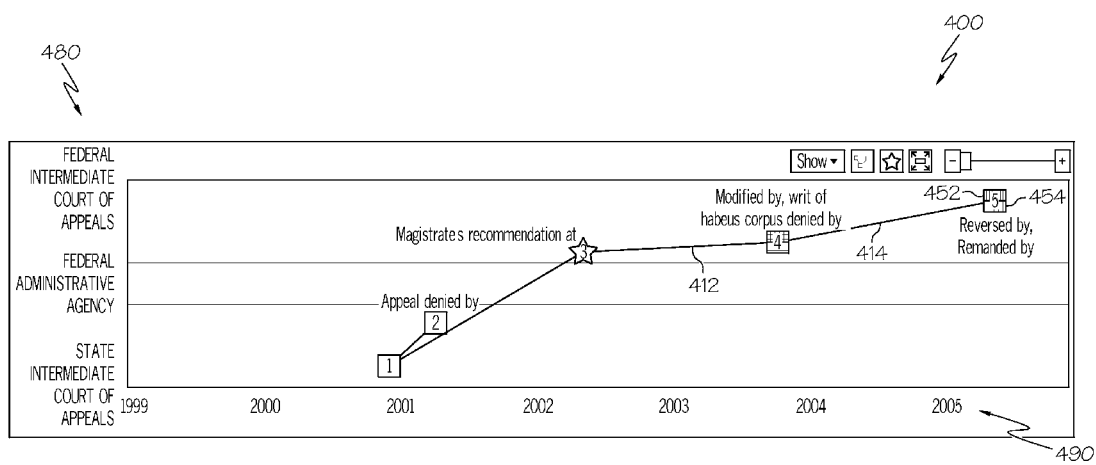
FIG. 4 depicts a schematic illustration of a map that graphically represents the association between a document of interest and other documents that analyze the document of interest, according to one or more embodiments shown and described herein.

Referring generally to the figures, particularly FIGS. 3 and 4, embodiments described herein are directed to systems and methods for providing for display a map that graphically represents the association among documents. The embodiments described herein may receive a request to generate a map, retrieve analysis information related to the way in which a second document analyzed a first document, and provide for a display a map indicating a graphical representation of the analysis information. The displayed map includes a first node corresponding to the first document, a second node corresponding to the second document, and a connector that graphically links the first node and the second node. The second node includes a graphical representation of the analysis information. Further, embodiments described herein may highlight a path between the first node and the second node. Various embodiments of systems and methods for providing for display a map that graphically represents the association among documents are described below.

Although the embodiments are described herein in the context of legal documents, and particularly court decisions, it should be understood that embodiments are not limited thereto. For example, the systems and methods described herein may be utilized to provide for display a map that graphically represents the association among legal documents other than court decisions, such as statutes, regulations, briefs, memoranda, etc. Furthermore, the systems and methods described herein may be utilized to provide for display a map that graphically represents the association among documents other than legal documents, such as patent documents, scientific research documents, news articles, journals, etc.

Figure 1:
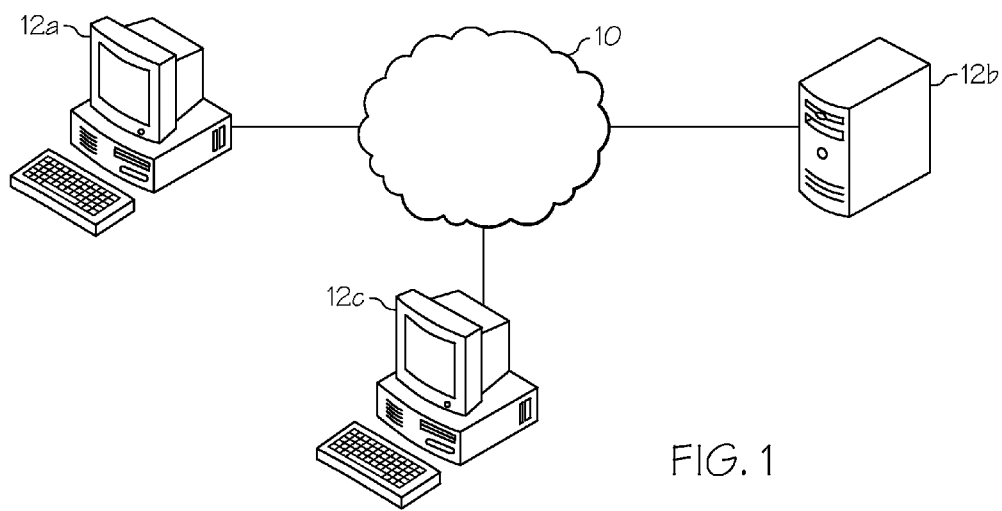
FIG. 1 depicts a schematic illustration of a computing network for a system for providing for display a map that graphically represents the association among documents, according to one or more embodiments shown and described herein.

Referring now to the drawings, FIG. 1 depicts an exemplary computing network, illustrating components for a system for providing for display a map that graphically represents the association among documents, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used by a user to generate a request for a graphical map that displays the association among documents and to display the requested graphical map. The user computing device 12a may also be utilized to perform other user functions, such as to provide a graphical user interface for interacting with the computing network and to display, or otherwise communicate, information to the user. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to transmit information to the user computing device 12a and/or the server computing device 12b.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
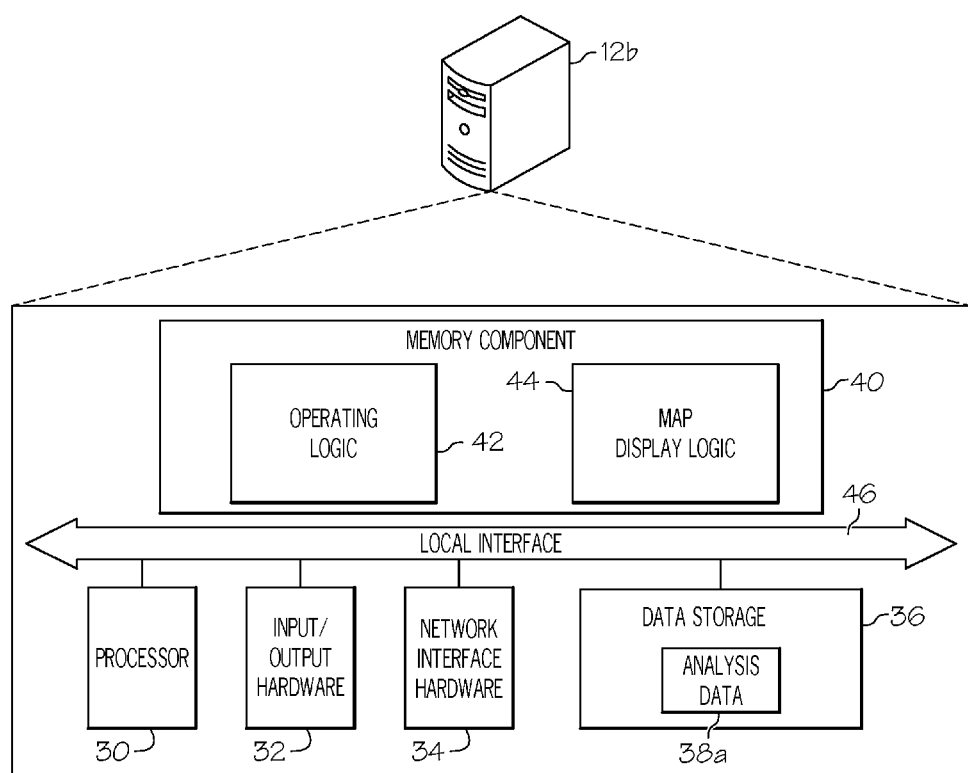
FIG. 2 depicts a schematic illustration of the server computing device from FIG. 1, further illustrating hardware and software that may be utilized in providing for display a map that graphically represents the association among documents, according to one or more embodiments shown and described herein.

FIG. 2 depicts the server computing device 12b, from FIG. 1, further illustrating a system for providing for display a map that graphically represents the association among documents, and/or a non-transitory computer-readable medium for providing for display a map that graphically represents the association among documents embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store analysis data 38a), and a non-transitory memory component 40. The memory component 40 may be configured as volatile and/or nonvolatile computer readable medium and, as such, may include random access memory (including SRAM, DRAM, and/or other types of random access memory), hard disk drives (HDD), flash memory, registers, compact discs (CD), digital versatile discs (DVD), Blu-Ray discs, and/or other types of storage components. Additionally, the memory component 40 may be configured to store operating logic 42 and map display logic 44 (each of which may be embodied as a computer program, firmware, or hardware, as an example). A local interface 46 is also included in FIG. 2 and may be implemented as a bus or other interface to facilitate communication among the components of the server computing device 12*b*.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12*b* and may be configured to store one or more pieces of data for access by the server computing device 12*b* and/or other components. As illustrated in FIG. 2, the data storage component 36 may store analysis data 38*a*. The analysis data 38*a* may be stored in one or more data storage devices.

Analysis data 38*a* may include at least one predefined analysis type to describe the manner in which a particular document was subsequently analyzed, characterized, treated, or otherwise impacted by documents associated with the particular document (hereinafter "the associated documents"). By way of example, and not by way of limitation, in the context of court decisions, the associated documents may include court decisions (e.g., decisions issued by federal, state, or administrative courts) in the prior or subsequent appellate history of a particular court decision (hereinafter "appellate history court decisions"). Analysis data 38*a* may also include citations, dates, court jurisdictions, pinpoint locations for where specific analyses occurred in a particular document, signal data, and/or other information pertinent to each appellate history court decision.

As noted above, analysis data 38*a* may include at least one predefined analysis type to describe the manner in which a particular document was subsequently analyzed, characterized, treated, or otherwise impacted by documents associated with the associated documents. In some embodiments, the predefined analysis types may generally indicate positive analysis, negative analysis, or neutral analysis. In other embodiments, the predefined analysis types may further differentiate between differing degrees of positive analysis and/or negative analysis, e.g., by utilizing a plurality of predefined analysis types that include specific predefined analysis types associated with each of multiple degrees of positive analysis and/or with each of multiple degrees of negative analysis. By way of example, and not by way of limitation, the possible predefined analysis types may include "Reversed," "Remanded," "Modified," "Appeal Denied," "Later Proceeding," "On Rehearing," "Rehearing Denied," "Writ of Certiorari Granted," "Writ of Certiorari Denied," "Amended," etc. In one embodiment, analysis data 38*a* may include analysis information from a Shepard's® database. In other embodiments analysis data 38*a* may include analysis information outside of the Shepard's® database.

Included in the memory component 40 are the operating logic 42 and the map display logic 44. The operating logic 42 may include an operating system and/or other software for managing components of the server computing device 12*b*. Similarly, the map display logic 44 may reside in the memory component 40 and may be configured to facilitate display of the map that graphically represents the association among documents.

It should be understood that the components illustrated in FIG. 2 are merely exemplary and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. Similarly, while FIG. 2 is directed to the server computing device 12*b*, other components such as the user computing device 12*a* and the administrator computing device 12*c* may include similar hardware, software, and/or firmware.

Referring now to FIG. 3 (and FIGS. 1 and 2), a flowchart that graphically illustrates a method of providing for display a map that graphically represents the association among documents according to one or more embodiments is provided. At block 302, the server computing device 12*b* may receive a request to generate a map that graphically represents the association among documents from the user computing device 12*a*. In one embodiment, the user of user computing device 12*a*, when viewing information pertaining to a document of interest, may be presented with a button or icon that the user may interact with in order to generate the request to display the map. For example, the button may contain the text "Map" to permit the user to select a map view of the relationship among the document of interest and other documents that analyze the document of interest. In another embodiment, the button may include an icon that represents a map. In response to interacting with (e.g., clicking on) the map button or icon, or otherwise requesting generation of a map to graphically represent the association between the document of interest and other documents that analyze the document of interest, the user computing device 12*a* may generate a request to generate a map, which is transmitted over the computer network 10 and received by server computing device 12*b* at block 302.

At block 304, the server computing device 12*b* may retrieve analysis information associated with the document of interest. In one embodiment, the server computing device 12*b* may retrieve analysis information from the analysis data 38*a* located in data storage component 36. Analysis data 38*a* may be stored in an XML file associated with the document. In one embodiment, in which the document of interest is a particular court decision of interest, the XML file may contain the appellate history court decisions associated with the particular court decision of interest. The XML file may include a plurality of appellate history court decision nodes, each of which corresponds to a particular appellate history court decision. Each appellate history court decision node may include an analysis type, indicating the way in which that appellate history court decision analyzed the particular court decision of interest. Each appellate history court decision node may also include, among other information, an identifier of the court that issued the decision and a year of decision.

In one embodiment, analysis information may be retrieved from the XML file via appropriate XQueries or other programmatic interaction with the XML file. The individual XQueries may be used to obtain, in a sorted order, the analysis information for all or a specific subset of the appellate history map decisions based on the specific request. Other XQueries may be used to allow for other appellate history court decisions to include sorted data in a format that may allow for creation of the map. In other embodiments, still more XQueries may be used such that the retrieved information may include additional information associated with each appellate history court decision. In embodiments that store analysis data 38a in an XML file, the analysis data 38a may be accessed by a manner other than XQueries. It should also be understood that in other embodiments, the analysis data 38a may be stored in a format other than an XML file.

At block 306, the server computing device 12b and/or the user computing device 12a may generate the map and provide it for display to the user of the user computing device 12a. In one embodiment, the map may be generated based on the retrieved analysis information of block 306. For example, the server computing device 12b may generate and transmit a message containing the analysis to a graphical display application or language (e.g., Microsoft Silverlight, Adobe FLASH, Javascript, etc.). The graphical display application may then receive the message and generate the map based on the retrieved analysis information contained in the received message. In other embodiments, graphical display applications or languages other than those specifically mentioned may be employed.

Although blocks 302-306 have been described as being separate tasks, in other embodiments, the blocks may be combined or omitted. Further, while the tasks of blocks 302-306 have been described as being performed in a particular order, in other embodiments, the tasks may be performed in a different order.

While the map has been described as being generated by the server computing device 12b in real-time in response to a request from the user computing device 12a, in other embodiments, the map may be generated ahead of time and stored, such that when a request to display the map is received by the server computing device 12b, the server computing device 12b can simply retrieve and provide for display the previously generated map.

Referring now to FIG. 4, a map 400 that graphically represents the association between a document of interest and other documents that analyze the document of interest is schematically depicted. It should be understood that embodiments are not limited to the configurations of the graphical representations illustrated throughout the figures, and that other graphical representations are possible. In one embodiment, the computer network 10 is the Internet and the graphical representations described herein are presented to the user via a web browser.

As depicted in FIG. 4, the map includes a vertical axis 480 and a horizontal axis 490. Vertical axis 480 comprises a plurality of textual labels associated with jurisdictions or courts. For example, vertical axis 480 may comprises a plurality of textual labels, each of which correspond to different level of court (e.g., United States Supreme Court, Federal Intermediate Court of Appeals, Federal Trial Courts, Federal Administrative Agencies, State High Courts, State Intermediate Court of Appeals, State Trial Courts, etc.). In the embodiment depicted in FIG. 4, "Federal Intermediate Court of Appeals," "Federal Administrative Agency," and "State Intermediate Court of Appeals" textual labels are displayed on vertical axis 480. Alternatively, each textual label displayed on vertical axis 480 may correspond to a particular court. For example, the label "2nd Circuit" may correspond to the United States Court of Appeals for the Second Circuit and/or all federal courts within the appellate jurisdiction of the Second Circuit. In other embodiments, vertical axis 480 may comprise a plurality of graphical icons, each of which corresponds to a different jurisdiction/court or level of jurisdictions/courts. It should be understood that the embodiments described herein are not limited to the particular textual labels displayed on the vertical axis 480 in FIG. 4.

The horizontal axis 490 may comprise a plurality of textual labels that correspond to different years or other measures of time. Each year label may correspond to a particular year. For example, the label "2000" may correspond to the year 2000. In other embodiments, horizontal axis 490 may comprise a plurality of graphical icons, each of which corresponds to a different year or other measure of time.

The map 400 further includes a plurality of nodes, including a node 1, a node 2, a node 3, a node 4, and a node 5. A plurality of connectors are also displayed on the map 400. Each connector graphically links a set of nodes together. For example, connector 412 graphically links node 3 and node 4. Connector 414 graphically links node 4 and node 5. In the embodiment depicted in FIG. 4, each connector is a line. However, it should be understood that in other embodiments the nodes may be graphically linked by a connector other than a line.

Each node displayed on the map 400 corresponds to a particular document. For example, node 1 may correspond to a first document, node 2 may correspond to a second document, node 3 may correspond to a third document, node 4 may correspond to a fourth document, and node 5 may correspond to a fifth document. A number may be displayed within each node. In some embodiments, the number displayed in each node corresponds to a document number in a separate list view of the documents. For example, the number "1" is displayed within node 1, the number "2" is displayed within node 2, the number "3" is displayed within node 3, the number "4" is displayed within node 4, and the number "5" is displayed within node 5. In other embodiments, a number may not be displayed within each node.

One of the displayed nodes typically corresponds to a document of interest. In the embodiment depicted in FIG. 4, node 3 corresponds to the document of interest (hereinafter "the node of interest"). The node of interest substantially resembles a star. In other embodiments, the node of interest may be displayed as a shape other than a star. The nodes corresponding to the other documents (hereinafter "the other nodes") may be graphically differentiated from the node of interest. In the embodiment of FIG. 4, the other nodes substantially resemble rectangles. However, it should be understood that in other embodiments the node of interest may have the same shape as the other nodes.

Each of the other nodes may include a graphical representation of analysis information that represents the manner in which each node analyzed the document of interest. In some embodiments, the graphical representation of the analysis information may be a color of the node. For example, the color may be selected from the group consisting of red, blue, green, yellow, orange, black, and gray where each color corresponds to a graphical representation of a different type of analysis. In other embodiments, the graphical representation of the analysis information may be a pattern of the node. In still other embodiments, the graphical representation of the analysis information may be a size of the node. In other embodiments, the graphical representation of the analysis information may be a combination of the color of the node, the pattern of the node, and the size of the node. However, it should be understood that the analysis information may be graphically represented in other ways in yet other embodiments.

In some embodiments, at least one of the nodes may include a graphical representation of analysis information corresponding to a first type of analysis and a second type of analysis. For example, a node corresponding to a document that analyzed the document of interest in two ways may include a first color representing the first type of analysis and a second color representing the second type of analysis. In the embodiment depicted in FIG. 4, node 5 includes a first color 452 corresponding to a first type of analysis and a second color 454 corresponding to a second type of analysis. In one particular embodiment in which the nodes displayed on the map 400 correspond to a court decision of interest (node 3), court decisions in the prior appellate history of the court decision of interest (nodes 1 and 2), and court decisions in the subsequent appellate history of the court decision of interest (nodes 4 and 5), the first color 452 of node 5 may graphically represent that the subsequent appellate history court decision corresponding to node 5 reversed the court decision of interest. Similarly, the second color 454 of node 5 may graphically represent that the subsequent appellate history court decision corresponding to node 5 remanded the court decision of interest.

In some embodiments, a textual summary of the way in which a node analyzed the document of interest may be displayed proximate to that node. For example, the textual summaries "reversed by" and "remanded by" may be displayed adjacent to node 5 to graphically indicate the two ways in which node 5 analyzed the document of interest corresponding to node 3. While the embodiment depicted in FIG. 4 displays textual summaries of the analysis information adjacent to some of the nodes that analyze the document of interest, other embodiments may not contain textual summaries, instead replying on the graphical presentation of the node itself (e.g., the color of the node, the shape of the node, the size of the node, the pattern of the node, etc.) to represent the analysis information.

Figure 5:
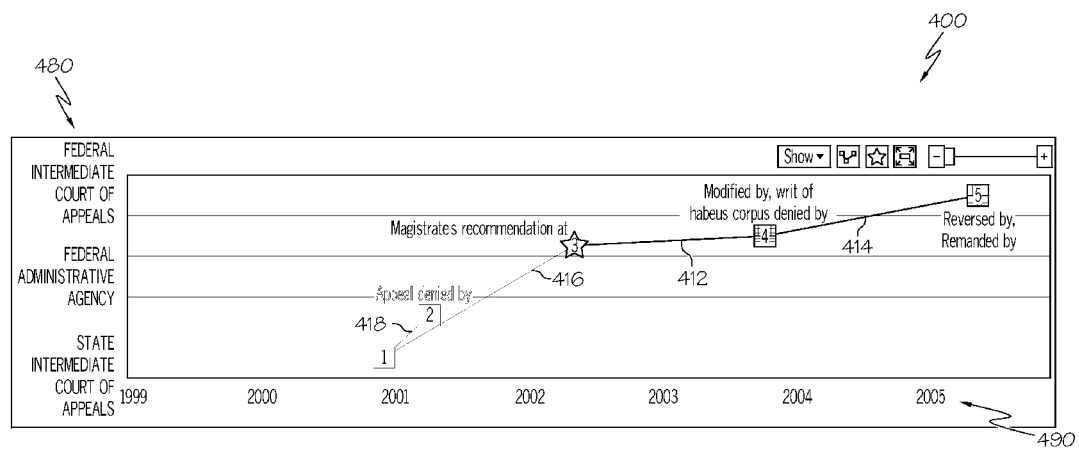
FIG. 5 depicts a schematic illustration of the map of FIG. 4, highlighting a path between nodes of the map, according to one or more embodiments shown and described herein.

The displayed map 400 may highlight a path between a selected node and the node of interest. For example, a user may manipulate a displayed node other than the node of interest by, for example, clicking on or otherwise interacting with the displayed node. In one embodiment, in response to the user manipulating a displayed node other than the node of interest, the map may be graphically processed to display a highlighted path between the manipulated node and the node of interest. For example, as shown in FIG. 5, when a user clicks on node 5, the path from node 5 to node 3 may be highlighted (including intermediary node 4). In one embodiment, the path may be highlighted by the displaying the connectors to have thicker lines. For example, in the embodiment depicted in FIG. 5, when node 5 is selected, connector 414 (connecting node 5 to node 4) and connector 412 (connecting node 4 to node 3) may be displayed bolder than the connectors not included in the path between node 5 and node 3 (e.g., connector 416 between node 3 and node 1 and connector 418 between node 1 and node 2). In another embodiment, the path may be highlighted by receding the connectors not associated with the highlighted path (e.g. by graying out). For example, in FIG. 5, connector 416 and connector 418 may be receded when node 5 is selected, such that the path between node 5 and node 3 is highlighted. In other embodiments, the color of the path may be based upon the way in which the selected node analyzed the node corresponding to the document of interest. In some embodiments, the nodes included in the highlighted path (here, nodes 3, 4, and 5) may be graphically differentiated from the nodes not included in the highlighted path (here, nodes 1, and 2) by, for example, receding the nodes not included in the highlighted path, as shown in FIG. 5.

Figure 6:
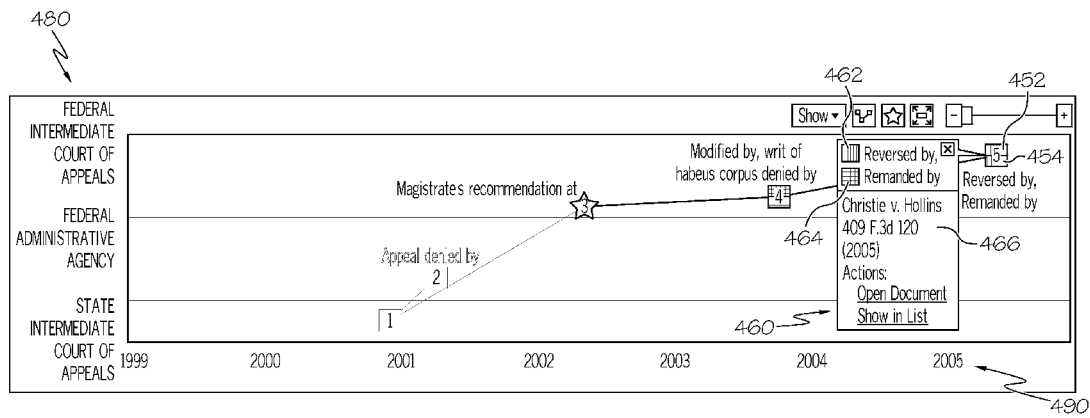
FIG. 6. depicts a schematic illustration of the map of FIG. 4, displaying additional information pertaining to a selected node, according to one or more embodiments shown and described herein.

Referring once again to FIG. 4, the displayed map 400 may permit a user to view additional information pertaining to a corresponding document associated with a node. For example, a user may manipulate a displayed node by, for example, clicking on or otherwise interacting with the displayed node. In one embodiment, in response to the user manipulating a displayed node, additional information pertaining to the document associated with the node may be displayed on the map. For example, as shown in FIG. 6, when a user clicks on node 5, additional information pertaining to the document associated with node 5 may be displayed in box 460. Box 460 may contain identifying information related to the document (the name and citation of the court decision in this example). Box 460 may also contain a first icon 462 and a second icon 464. The first icon 462 may correspond to the first color 452 (which represented a way in which the document associated with node 5 analyzed the document of interest) and may also contain a textual indication of the analysis type (here, "Reversed by"). The second icon 464 may correspond to the second color 454 (which represented another way in which the document associated with node 5 analyzed the document of interest) and may also contain a textual indication of the analysis type (here, "Remanded by"). It should be understood that additional or different information related to the document associated with the selected node may be displayed.

Figure 7:
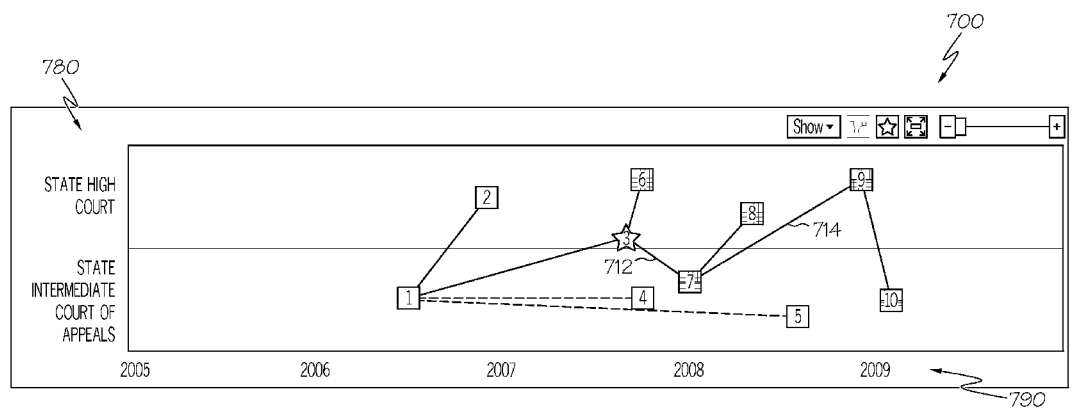
FIG. 7 depicts a schematic illustration of a map that graphically represents the association between a document of interest and other documents that analyze the document of interest, according to one or more embodiments shown and described herein.

Referring now to FIG. 7, an exemplary map 700 that graphically represents the association between a document of interest and other documents that analyze the document of interest is schematically depicted. The map 700 of FIG. 7 illustrates a more complicated graphical representation of the association among documents than the map of FIG. 4. It should be understood that embodiments are not limited to the configurations of the graphical representations illustrated throughout the figures, and that other graphical representations are possible. In one embodiment, the computer network 10 is the Internet and the graphical representations described herein are presented to the user via a web browser.

As depicted in FIG. 7, the map includes a vertical axis 780 and a horizontal axis 790. Vertical axis 780 comprises a plurality of textual labels associated with jurisdictions or courts. For example, vertical axis 780 may comprises a plurality of textual labels, each of which correspond to different level of court (e.g., United States Supreme Court, Federal Intermediate Court of Appeals, Federal Trial Courts, Federal Administrative Agencies, State High Courts, State Intermediate Court of Appeals, State Trial Courts, etc.). In the embodiment depicted in FIG. 7, "State High Court" and "State Intermediate Court of Appeals" are displayed on vertical axis 780. Alternatively, each textual label displayed on vertical axis 780 may correspond to a particular court. In other embodiments, vertical axis 780 may comprise a plurality of graphical icons, each of which corresponds to a different jurisdiction/court or level of jurisdictions/courts. It should be understood that the embodiments described herein are not limited to the particular textual labels displayed on the vertical axis 780 in FIG. 7.

The horizontal axis 790 may comprise a plurality of textual labels that correspond to different years or other measures of time. Each year label may correspond to a particular year. For example, the label "2007" may correspond to the year 2007. In other embodiments, horizontal axis 790 may comprise a plurality of graphical icons, each of which corresponds to a different year or other measure of time.

The map 700 further includes a plurality of nodes, including a node 1, a node 2, a node 3, a node 4, a node 5, a node 6, a node 7, a node 8, a node 9, and a node 10. A plurality of connectors are also displayed on the map 700. As described with respect to the map 400 of FIG. 4, each connector graphically links a set of nodes together. For example, connector 712 connects node 3 and node 7. Connector 714 connects node 7 and node 9. Each node displayed on the map 700 corresponds to a particular document. For example, the node 1 may correspond to a first document, node 2 may correspond to a second document, node 3 may correspond to a third document, and so on.

One of the displayed nodes typically corresponds to a document of interest. In the embodiment depicted in FIG. 7, node 3 corresponds to the document of interest (hereinafter, "the node of interest"). The node of interest substantially resembles a star. In other embodiments, the node of interest may be displayed as a shape other than a star. The other nodes may be graphically differentiated from the node of interest. In the embodiment of FIG. 7, the other nodes substantially resemble rectangles. However, it should be understood that in other embodiments the node of interest may have the same shape as the other nodes.

As described above with respect to FIG. 4, each node other than the node of interest may include a graphical representation of analysis information that represents the manner in which each node analyzed the document of interest (e.g., the color of the node, the pattern of the node, the size of the node, and combinations thereof).

Figure 8:
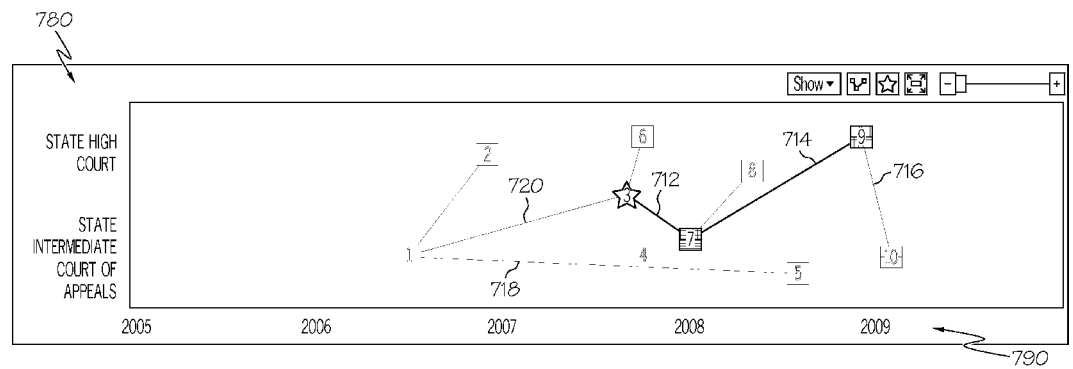
FIG. 8 depicts a schematic illustration of the map of FIG. 6, highlighting a path between nodes of the map, according to one or more embodiments shown and described herein.

The displayed map 700 may highlight a path between a selected node and the node of interest. For example, a user may manipulate a displayed node other than the node of interest by, for example, clicking on or otherwise interacting with the displayed node. In one embodiment, in response to the user manipulating a displayed node other than the node of interest, the map may be graphically processed to display a highlighted path between the manipulated node and the node and the node of interest. For example, as shown in FIG. 8, when a user clicks on node 9, the path from node 9 to node 3 may be highlighted (including intermediary node 7). In one embodiment, the path may be highlighted by the displaying the connectors to have thicker lines. For example, in the embodiment depicted in FIG. 8, when node 9 is selected, connector 714 (connecting node 9 to node 7) and connector 712 (connecting node 7 to node 3) may be displayed bolder than the connectors not included in the path between node 9 and node 3 (e.g., connector 716 between node 9 and node 10, connector 718 between node 5 and node 1, and connector 720 between node 1 and node 3). In another embodiment, the path may be highlighted by receding the connectors not associated with the highlighted path (e.g. by graying out). For example, in FIG. 8, connector 716, connector 718, and connector 720 may be receded when node 9 is selected, such that the path between node 9 and node 3 is highlighted. In other embodiments, the color of the path may be based upon the way in which the selected node analyzed the node corresponding to the document of interest. In some embodiments, the nodes included in the highlighted path (here, nodes 3, 7, and 9) may be graphically differentiated from the nodes not included in the highlighted path (here, nodes 1, 2, 4, 5, 6, 8, and 10) by, for example, receding the nodes not included in the highlighted path, as shown in FIG. 8

It should be understood that embodiments described herein provide for systems and methods for providing for display maps that graphically represents the association among documents. The displayed map may enable a user to quickly, efficiently, and easily visualize and understand the way in which a document analyzed another document. In the context of a map graphically representing the association between a court decision of interest and the subsequent appellate history decisions pertaining to the court decision of interest, the map may display a graphical representation of the way in which the court decision of interest has been analyzed by one or more court decisions in the subsequent appellate history. The displayed map may also display a highlighted path between a selected subsequent appellate history court decision and the court decision of interest to provide a graphical indication of the relationship between the selected subsequent history court decision and the court decision of interest.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing for display a map that graphically represents the association between a first document and a second document that analyzes the first document, the method comprising:
   receiving, at a computer, a request to generate the map;
   in response to the received request, retrieving from a database analysis information related to the way in which the second document analyzed the first document; and
   providing for display the map, wherein the map comprises a first node, a second node, and a connector, wherein:
   the first node corresponds to the first document;
   the second node corresponds to the second document;
   the connector graphically links the first node and the second node; and
   the second node includes a graphical representation of the analysis information.

2. The method of claim 1, wherein the first document is a court decision or an administrative decision.

3. The method of claim 2, wherein a vertical dimension of the map corresponds to a level of court and a horizontal dimension of the map corresponds to time, the first node is positioned on the map based on a first date that the first document was issued and a first court that issued the first document, and the second node is positioned on the map based on a second date that the second document was issued and a second court that issued the second document.

4. The method of claim 1, wherein the document is a statute.

5. The method of claim 1, wherein the graphical representation of the analysis information is a color of the second node.

6. The method of claim 1, wherein the color is selected from the group consisting of: red, blue, green, yellow, orange, black, and gray.

7. The method of claim 1, wherein the connector is a line.

8. The method of claim 1, wherein the first node substantially resembles a star and the second node substantially resembles a rectangle.

9. The method of claim 1, wherein the analysis information comprises a first type of analysis and a second type of analysis, and the graphical representation of the analysis information includes a first color corresponding to the first type of analysis and a second color corresponding to the second type of analysis.

10. The method of claim 1, further comprising:
in response to a user manipulating the second node, displaying additional information related to the second document.

11. A method for highlighting a path between a first document and a second document that analyzes the first document, the method comprising:
providing for display, by a computer, a map that graphically represents the association between the first document and the second document, wherein the map includes a first node corresponding to the first document, a second node corresponding to the second document, and a first connector graphically linking the first node and the second node, wherein the second node displayed on the map includes a graphical representation of the way in which the second document analyzed the first document; and
in response to a user manipulating the second node on the map, graphically processing the displayed map to highlight the path between the first node and the second node.

12. The method of claim 11, wherein a color of the path is based on the way in which the second document analyzed the first document.

13. The method of claim 11, wherein the map provided for display further comprises a third node corresponding to a third document and a second connector connecting the third node to the first node, wherein the third node is not in the path between the first node and second node, the method further comprising: in response to the user manipulating the second node on the map, graphically processing the display of the second connector such that the second connector and the third node appear receded.

14. The method of claim 11, wherein the second node includes a graphical representation of analysis information related to the way in which the second document analyzed the first document.

15. The method of claim 11, wherein the document is a court decision or an administrative decision.

16. The method of claim 15 wherein a vertical dimension of the map corresponds to a level of court and a horizontal dimension of the map corresponds to time, the first node is positioned on the map based on a first date that the first document was issued and a first court that issued the first document, and the second node is positioned on the map based on a second date that the second document was issued and a second court that issued the second document.

17. The method of claim 11, wherein the document is a statute.

18. The method of claim 11, wherein the graphical representation of the way in which the second document analyzed the first document is a color of the second node.

19. A system for providing for display a map that graphically represents the association between a first document and a second document that analyzes the first document, the system comprising:
a computing device that comprises a non-transitory memory component that stores a set of executable instructions that causes the computing device to:
receive a request to generate the map;
in response to the received request, retrieve from a database analysis information related to the way in which the second document analyzed the first document; and
provide for display the map, wherein the map comprises a first node, a second node, and a connector, wherein:
the first node corresponds to the first document;
the second node corresponds to the second document; the connector graphically links the first node and the second node; and
the second node includes a graphical representation of the analysis information.

* * * * *